US006330942B1

(12) United States Patent
Raymond

(10) Patent No.: US 6,330,942 B1
(45) Date of Patent: Dec. 18, 2001

(54) COIN COLLECTING CARD AND INFORMATION RELATING THERETO

(76) Inventor: June K. Raymond, 5023 N. River Rd., Schiller Park, IL (US) 60176

( * ) Notice: Subject to any disclaimer, the term of this patent is extended or adjusted under 35 U.S.C. 154(b) by 0 days.

(21) Appl. No.: 09/569,618

(22) Filed: May 12, 2000

(51) Int. Cl.[7] .......... B65D 85/00; G09B 29/00

(52) U.S. Cl. .......... 206/0.84; D99/34; 206/0.8; 206/459.5; 434/150

(58) Field of Search .......... 206/0.8, 0.81–0.84, 206/445, 459.5; 273/157 R, 254; 434/130, 150–153; D99/34

(56) References Cited

U.S. PATENT DOCUMENTS

D. 353,843 12/1994 Martin .
D. 402,784 * 12/1998 Saunders .......... D99/34
D. 428,680 * 7/2000 Hildebrand et al. .......... D99/34
D. 432,571 * 10/2000 Cercone et al. .......... D99/34
791,118 5/1905 Wade .
1,292,184 1/1919 Wells .
1,745,946 * 2/1930 Murray .......... 434/130
2,199,499 * 5/1940 Kreitler .......... 434/150
3,347,550 * 10/1967 Carboni .......... 434/150
3,371,851 3/1968 Silene et al. .
4,103,436 * 8/1978 Strussion et al. .......... 434/151
4,429,787 2/1984 Morse .
4,674,752 * 6/1987 Brothers .......... 273/254
5,467,997 11/1995 Bashirzadeh .
5,551,700 9/1996 Druce et al. .
5,580,252 * 12/1996 McCrady .......... 434/150
5,690,336 11/1997 Oliver .
5,988,366 * 11/1999 Krull et al. .......... 206/0.84

* cited by examiner

*Primary Examiner*—Jim Foster

(57) ABSTRACT

A coin collecting card and information relating thereto for removably holding a coin and relating information pertinent to that coin. The coin collecting card and information relating thereto includes a front side, a back side and a peripheral edge. First indicia are located on the front side of the plate. The first indicia indicate a map of a region representing the coin, or a place of origin of the coin. A well, or slot, extends into the front side of the plate. The well has a shape adapted for receiving a respective coin from the region represented by the first indicia.

9 Claims, 3 Drawing Sheets

COIN COLLECTING CARD AND INFORMATION RELATING THERETO

BACKGROUND OF THE INVENTION

1. Field of the Invention

The present invention relates to coin collecting devices and more particularly pertains to a new coin collecting card and information relating thereto for removably holding a coin and relating information pertinent to that coin.

2. Description of the Prior Art

The use of coin collecting devices is known in the prior art. More specifically, coin collecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,429,787; U.S. Pat. No. 3,371,851; U.S. Pat. No. 5,690,336; U.S. Pat. No. 5,551,700; U.S. Pat. No. 5,467,997; U.S. Pat. No. 1,297,184; U.S. Pat. No. 791,118; and U.S. Des. Pat. No. 353,843.

While these devices fulfill their respective, particular objectives and requirements, the aforementioned patents do not disclose a new coin collecting card and information relating thereto. The inventive device includes a front side, a back side and a peripheral edge. First indicia are located on the front side of the plate. The first indicia indicate a map of a region representing the coin, or a place of origin of the coin. A well, or slot, extends into the front side of the plate. The well has a shape adapted for receiving a respective coin from the region represented by the first indicia.

In these respects, the coin collecting card and information relating thereto according to the present invention substantially departs from the conventional concepts and designs of the prior art, and in so doing provides an apparatus primarily developed for the purpose of removably holding a coin and relating information pertinent to that coin.

SUMMARY OF THE INVENTION

In view of the foregoing disadvantages inherent in the known types of coin collecting devices now present in the prior art, the present invention provides a new coin collecting card and information relating thereto construction wherein the same can be utilized for removably holding a coin and relating information pertinent to that coin.

The general purpose of the present invention, which will be described subsequently in greater detail, is to provide a new coin collecting card and information relating thereto apparatus and method which has many of the advantages of the coin collecting devices mentioned heretofore and many novel features that result in a new coin collecting card and information relating thereto which is not anticipated, rendered obvious, suggested, or even implied by any of the prior art coin collecting devices, either alone or in any combination thereof.

To attain this, the present invention generally comprises a front side, a back side and a peripheral edge. First indicia are located on the front side of the plate. The first indicia indicate a map of a region representing the coin, or a place of origin of the coin. A well, or slot, extends into the front side of the plate. The well has a shape adapted for receiving a respective coin from the region represented by the first indicia.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new coin collecting card and information relating thereto apparatus and method which has many of the advantages of the coin collecting devices mentioned heretofore and many novel features that result in a new coin collecting card and information relating thereto which is not anticipated, rendered obvious, suggested, or even implied by any of the prior art coin collecting devices, either alone or in any combination thereof.

It is another object of the present invention to provide a new coin collecting card and information relating thereto which may be easily and efficiently manufactured and marketed.

It is a further object of the present invention to provide a new coin collecting card and information relating thereto which is of a durable and reliable construction.

An even further object of the present invention is to provide a new coin collecting card and information relating thereto which is susceptible of a low cost of manufacture with regard to both materials and labor, and which accordingly is then susceptible of low prices of sale to the consuming public, thereby making such coin collecting card and information relating thereto economically available to the buying public.

Still yet another object of the present invention is to provide a new coin collecting card and information relating thereto which provides in the apparatuses and methods of the prior art some of the advantages thereof, while simultaneously overcoming some of the disadvantages normally associated therewith.

Still another object of the present invention is to provide a new coin collecting card and information relating thereto for removably holding a coin and relating information pertinent to that coin.

Yet another object of the present invention is to provide a new coin collecting card and information relating thereto which includes a front side, a back side and a peripheral edge. First indicia are located on the front side of the plate. The first indicia indicate a map of a region representing the coin, or a place of origin of the coin. A well, or slot, extends into the front side of the plate. The well has a shape adapted for receiving a respective coin from the region represented by the first indicia.

Still yet another object of the present invention is to provide a new coin collecting card and information relating thereto that may be used as teaching device learning information about each of the states.

Even still another object of the present invention is to provide a new coin collecting card and information relating thereto that may be modified for use for other regions and countries.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
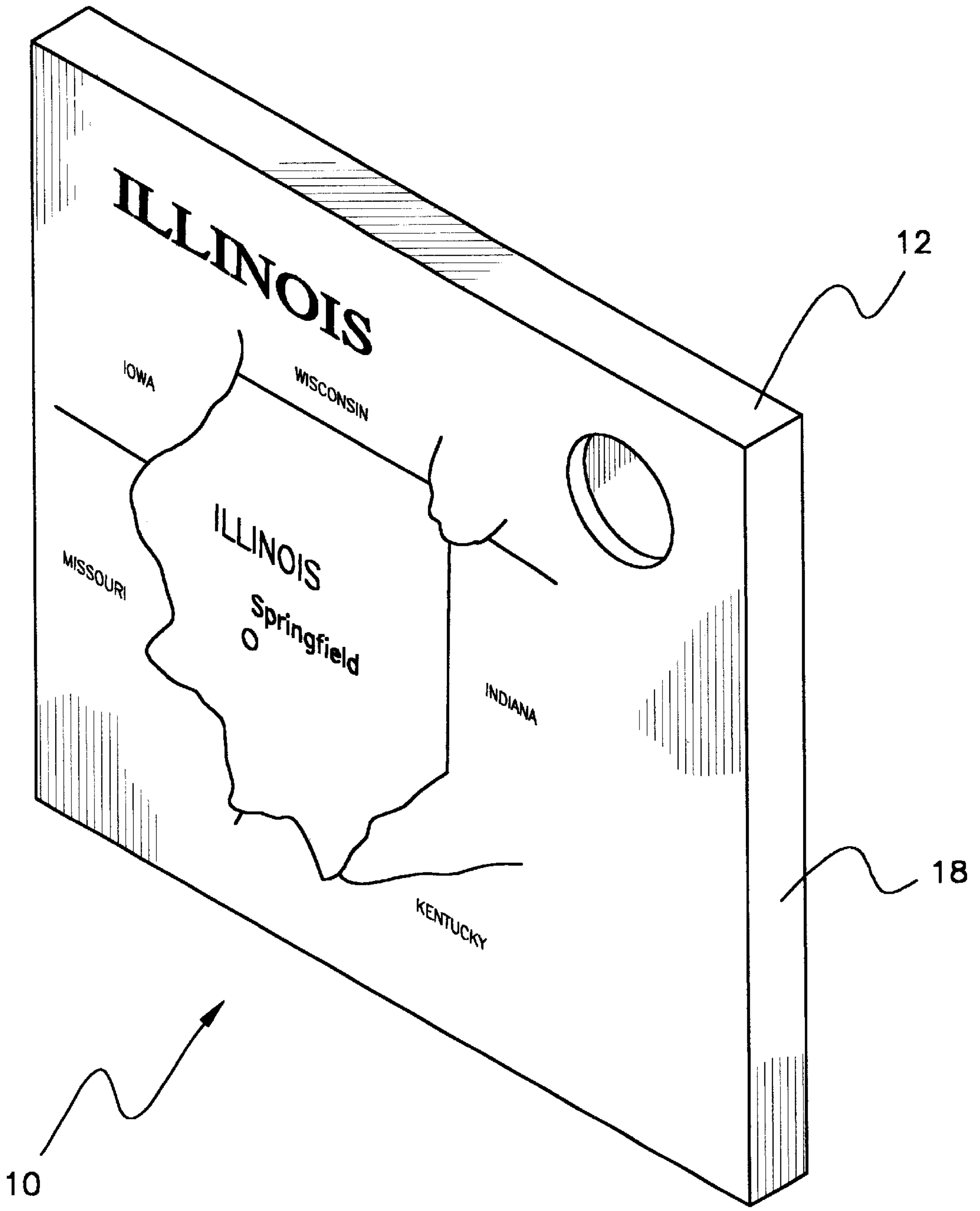
FIG. 1 is a schematic perspective view of a new coin collecting card and information relating thereto according to the present invention.

With reference now to the drawings, and in particular to FIGS. 1 through 4 thereof, a new coin collecting card and information relating thereto embodying the principles and concepts of the present invention and generally designated by the reference numeral 10 will be described.

As best illustrated in FIGS. 1 through 4, the coin collecting card and information relating thereto 10 generally comprises a plurality of plates 12. Each of the plates is designed to hold one of the commemorative state quarters being issued by the U.S. Mint, such that the state logo may be visible in the plate.

Each plate 12 has a front side 14, a back side 16 and a peripheral edge 18. The front 14 and back sides 16 have a generally rectangular shape. Each of the plates 12 preferably comprises a cardboard material though plastic or metal may also be used. Preferably, the plates 12 have a length between 3 and 6 inches, a width between 2 and 5 inches, and a height between ¼ inch and 1 inch. Ideally, each of the plates 12 has a length substantially equal to 4 inches, a width substantially equal to 3 inches and a height generally less than ½ inch.

Figure 2:
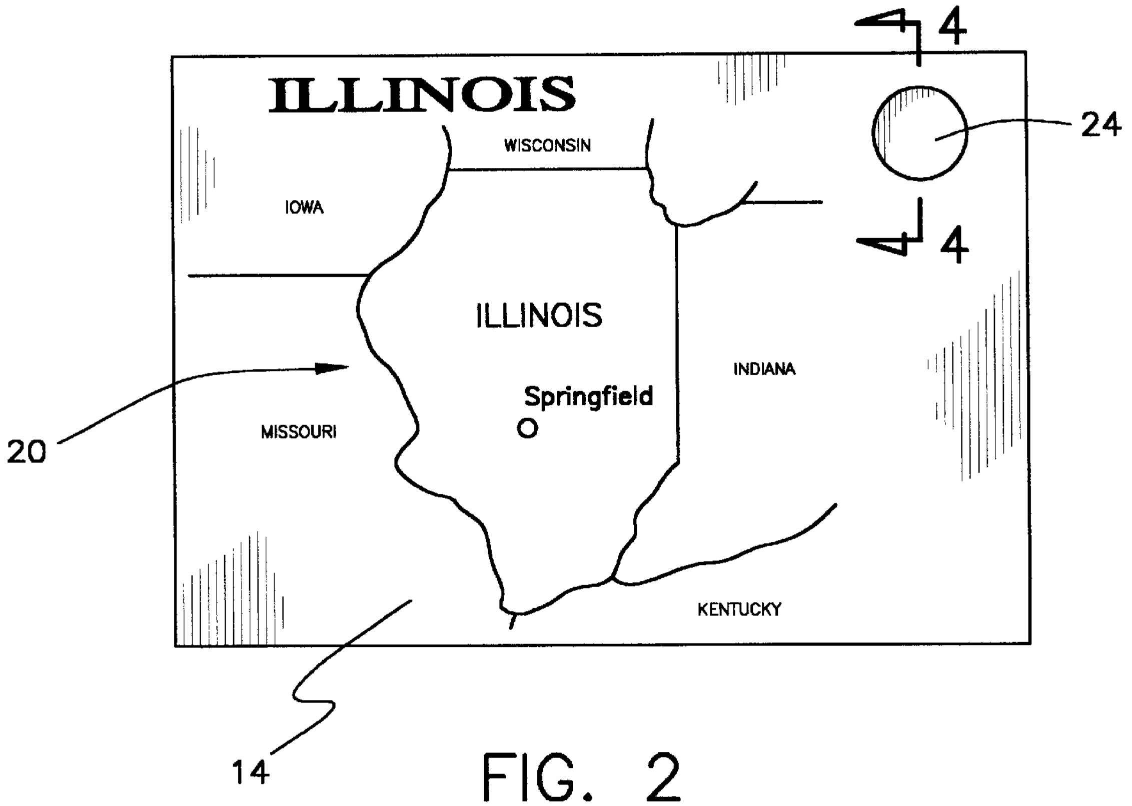
FIG. 2 is a schematic plan view of the front side of the present invention.
Figure 3:
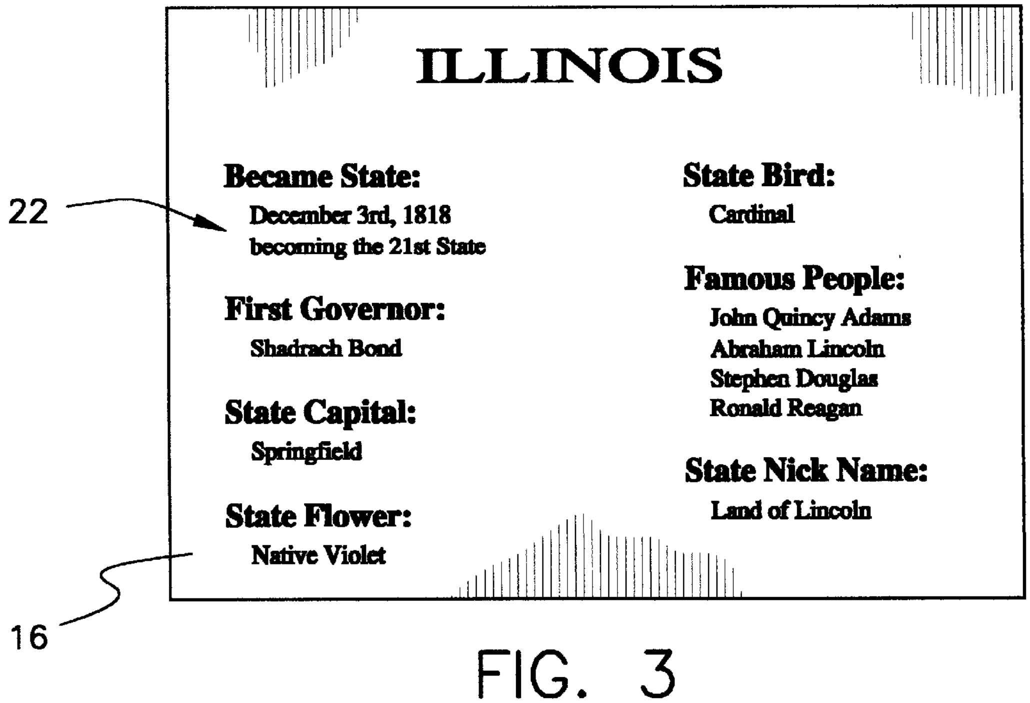
FIG. 3 is a schematic plan view of the back side of the present invention.
Figure 4:
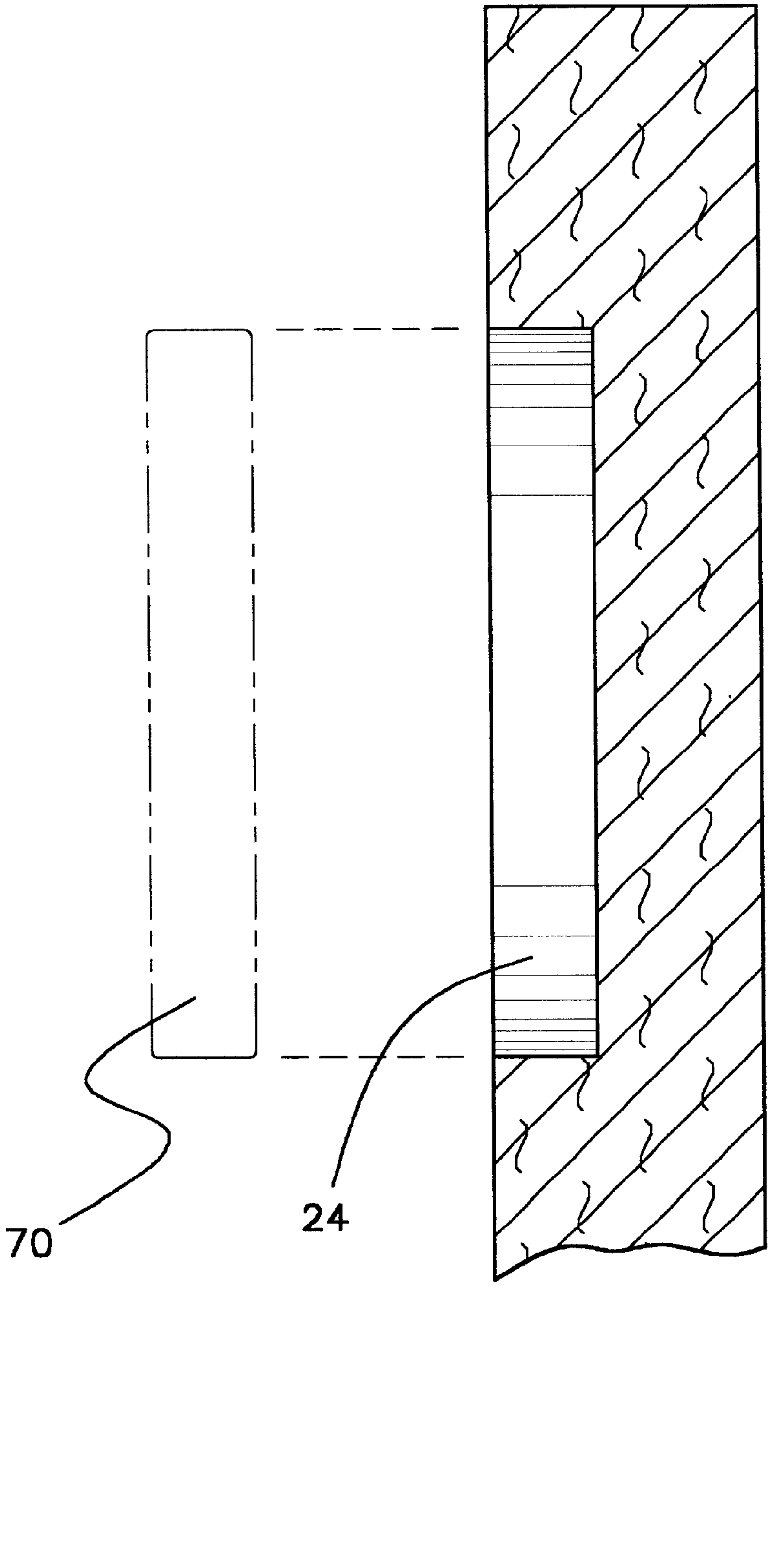
FIG. 4 is a schematic cross-sectional view taken along line 4—4 of the present invention.

A first indicia 20 is located on the front side 14 of the plate 12. The first indicia 20 indicates a map of a United States state. The state of Illinois is depicted in FIGS. 1 and 2 along with portions of border states.

A second indicia 22 is located on the back side 16 of the plate 12. The second indicia 22 indicates state information respective to the state indicated by the first indicia 20. Such second indicia 22 may include, among other items, the date of statehood, first governor, capital, state flower, state bird, state motto or nickname, and famous people from the state.

An annular well 24 extends into the front side 14 of the plate 12. The annular well 24 has a shape adapted for removably receiving a United States twenty-five cent piece 70 such that the twenty-five cent piece 70 is generally flush with a surface of the front side 14. Thus the depth of the annular well is substantially equal to the depth of a U.S. quarter dollar piece and its diameter is substantially equal to the quarter dollar piece.

The plurality of plates 12 is ideally fifty plates, or how many states may exist in the United States, wherein each of the plates has indicia thereon indicative of a state of the United States. The coin collector may collect each of the commemorative coins currently being issued which depict a state emblem in place of the eagle. The plates provide an attractive means for holding the coins while offering information to be learned about the respective state.

The indicia 20, 22 on the plates 12 may be changed so that countries and regions from around the world may also be used. The well would have dimensions such that coins from those regions may be placed in the plate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coin collecting card and information relating thereto, said card comprising:

at least one plate, plate comprising:

- a front side, a back side and a peripheral edge;
- a first indicia being located on said front side of said plate, said first indicia indicating a map of a region representing the coin;
- a well, said well extending into said front side of said plate, said well having a shape adapted for removably receiving a respective coin from said region; and wherein said plate is a plurality of plates, each of said plates further comprising:

- a second indicia being located on said back side of said plate, said second indicia indicating regional information respective to said region indicated by said first indicia.

2. The coin collecting card and information relating thereto as in claim 1, wherein each of said plates further comprise:

said front and back sides having a generally rectangular shape.

3. The coin collecting card and information relating thereto as in claim 1, each of said plates having a length substantially equal to 4 inches, and a width substantially equal to 3 inches.

4. The coin collecting card and information relating thereto as in claim 1, wherein each of said plates comprises a cardboard material.

5. A coin collecting card and state information relating thereto, said card comprising:

a plurality of plates, each of said plates comprising:

a front side, a back side and a peripheral edge, said front and back sides having a generally rectangular shape, each of said plates comprising a cardboard material, each of said plates having a length substantially equal to 4 inches, a width substantially equal to 3 inches and a height generally less than ½ inch;

a first indicia being located on said front side of said plate, said first indicia indicating a map of a United States state;

a second indicia being located on said back side of said plate, said second indicia indicating state information respective to said state indicated by said first indicia;

an annular well, said annular well extending into said front side of said plate, said annular well having a shape adapted for removably receiving a United States twenty-five cent piece such that said twenty-five cent piece is generally flush with a surface of said front side; and said plurality of plates being a plate for each state of the United States, wherein each of said plates has indicia thereon indicative of a state of the United States.

6. A coin collecting card and information relating thereto, said card comprising:

a plurality of plates, each plate having a front side, a back side and a peripheral edge;

a first indicia being marked on the front side of each of said plates, said first indicia indicating a map of a region representing the coin;

a well extending into the front side of each of said plates, said well having a shape adapted for removably receiving a coin; and a second indicia being marked on the back side of each of said plates, said second indicia indicating regional information corresponding to said region indicated by said first indicia.

7. The coin collecting card as in claim 6, wherein said front and back sides of each of said plates each have a generally rectangular shape.

8. The coin collecting card as in claim 6, wherein each of said plates has a length substantially equal to 4 inches, and a width substantially equal to 3 inches.

9. The coin collecting card and information relating thereto as in claim 6, wherein each of said plates comprises a cardboard material.

* * * * *